United States Patent

Bourassa et al.

Patent Number: 5,579,938
Date of Patent: Dec. 3, 1996

[54] CLAMP FOR DEVICE BOX

[75] Inventors: Alain Bourassa, Laval; Sylvain Poissant, Sainte-Dorothée; Alain Legris; Claude Lacroix, both of Montréal, all of Canada

[73] Assignee: Temco Electric Products Company Inc., Montréal, Canada

[21] Appl. No.: 559,714

[22] Filed: Nov. 15, 1995

[51] Int. Cl.$^6$ .................................................. H02G 3/08
[52] U.S. Cl. ......................................... 220/3.2; 174/65 R
[58] Field of Search ........................ 220/3.2; 174/65 R; 285/128, 162

[56] References Cited

U.S. PATENT DOCUMENTS

| | | | |
|---|---|---|---|
| 2,051,129 | 8/1936 | Clayton | 220/3.2 |
| 2,556,977 | 6/1951 | Paige . | |
| 2,686,065 | 8/1954 | Bergquist | 220/3.2 |
| 3,082,023 | 3/1963 | Rudolph et al. | 285/128 |
| 4,316,999 | 2/1982 | Nattel | 174/65 R |
| 4,317,954 | 3/1982 | Giammarra | 220/3.2 |
| 4,366,343 | 12/1982 | Slater et al. | 220/3.2 |
| 4,591,658 | 5/1986 | Bauer et al. | 174/65 R |
| 4,605,816 | 8/1986 | Jorgensen et al. | 174/65 R |

FOREIGN PATENT DOCUMENTS 658728  8/1963  Canada .

Primary Examiner—Joseph M. Moy
Attorney, Agent, or Firm—Darby & Darby, P.C.

[57] ABSTRACT

A clamp for use to fix nonmetallic sheathed or armored cables within an electrical device box. This clamp has an L-shaped body with a forwardly projecting front wall and an upwardly projecting rear wall. The front wall has a central hole and a rectilinear front edge of a given length that is parallel to the rear wall. An integral U-shaped element projects from the front edge of the L-shaped body along the full length of it. Two upwardly embossed portions are made in the front wall. These portions are symmetrical with respect to the central hole and each has a semi-cylindrical cross-section with an axis perpendicular to the rear wall. Each embossed portion ends at a short distance from the rear wall and defines therewith a locking ridge. Two front openings are made in the front wall at the junction of the embossed portions with the front edge of the body. In use, fixation of the clamp within the device box with a screw inserted into the central hole of the front wall of the clamp allows one or two cables to be squeezed and thus be fixed either between the U-shaped element, the corresponding locking ridge and the adjacent wall of the box when the cable is of the nonmetallic sheathed type, or within one of the embossed portions when the cable is of the armored type. Advantageously, a forwardly and downwardly projecting tab can be provided in the rear wall of the clamp, to retain the screw used to fix it into the device box.

9 Claims, 6 Drawing Sheets

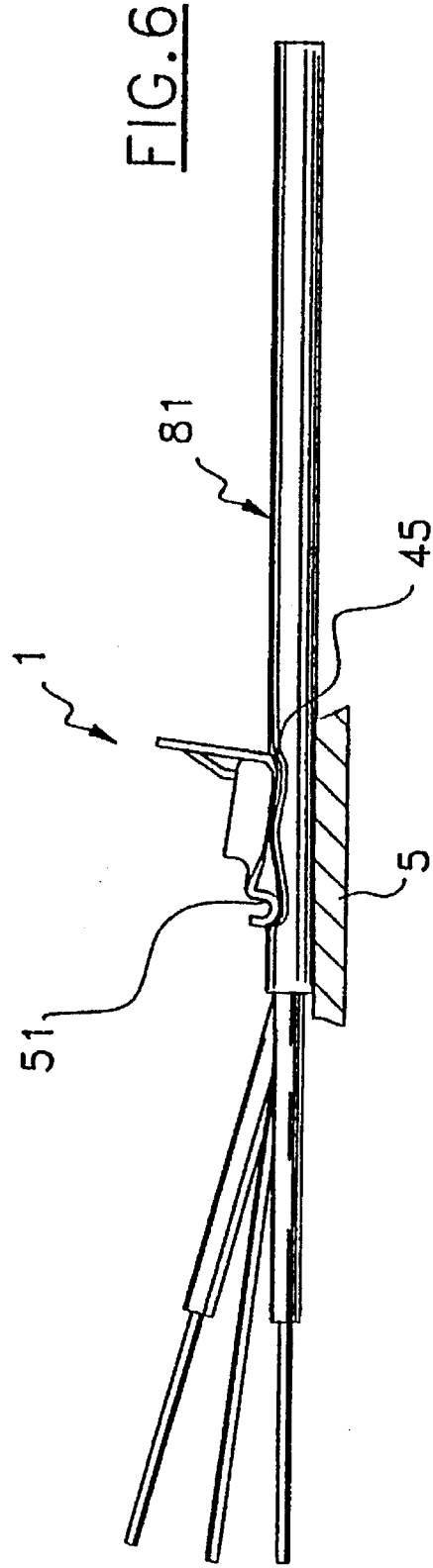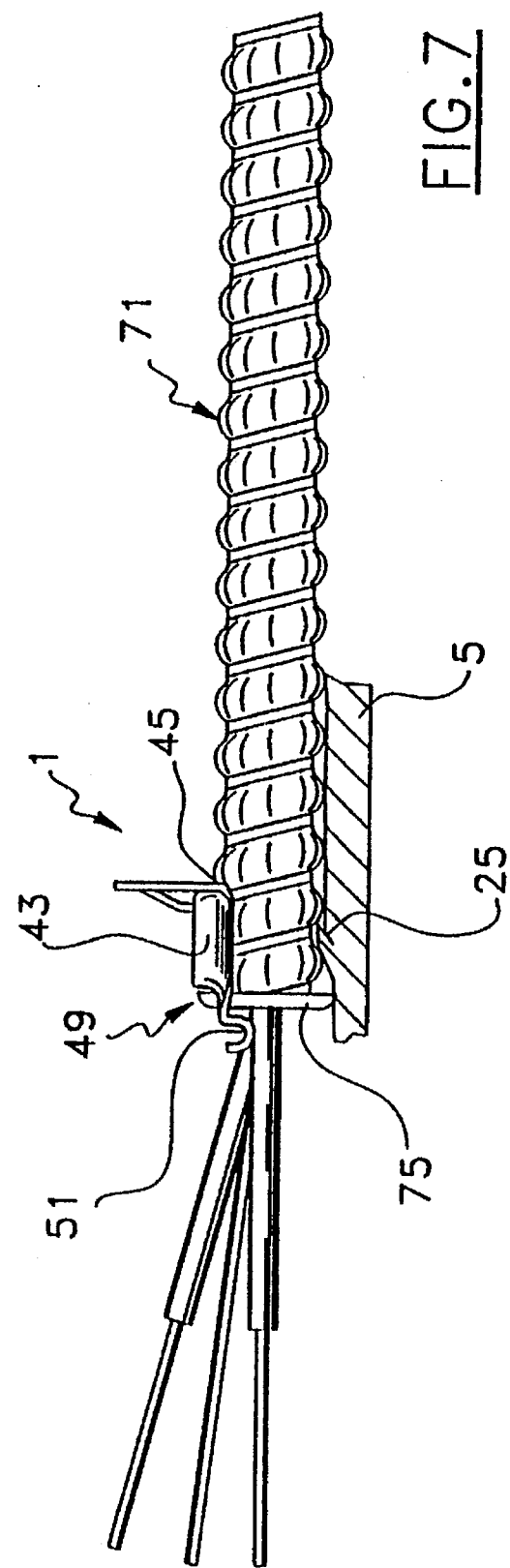

CLAMP FOR DEVICE BOX

BACKGROUND OF THE INVENTION a) Field of the Invention

The present invention relates to a clamp for use to fix within an electrical device box one or two cables projecting from openings made in this box.

More particularly, the invention relates to a clamp of the above mentioned type, which is very simple yet efficient in structure, very easy and cheap to manufacture and useable to fix indifferently nonmetallic sheathed cables and/or armored cables.

In the following description and claims, the expression "electrical device box" is intended to designate any kind of boxes that are used for electrical connections, such as switch boxes, electrical outlet boxes and the like.

b) Brief Description of the Prior Art

It is of common practice to use clamps to fix electrical cables projecting from openings preferably of the knockout type, that are made in a device box. Such clamp is usually L-shaped and attachable to the box by means of a screw insertable into a central opening made in one of its walls. The wall having this opening is shaped so as to define cavities or embossments devised to fit onto and restrain the cable(s) that must be fixed into the box.

It is also well known that the electric cables presently in use can be classified into two different categories including, on the one hand, cables of the "nonmetallic sheathed" type, viz. cables in which the electric wires are embedded into a thick plastic sheathing, and, on the other hand, cables of the "armored" type, viz. cables in which the electric wires extend through and are protected by a metal tube. Examples of such cables of the nonmetallic sheathed and armored types are presently available in the market under the tradenames LOOMEX and BX, respectively.

In addition to the above mentioned structural differences, there is also different standards and requirements for each of these cables. For example, in use, it is compulsory to insert an antishort bushing into the end of an armored cable prior to fix it into a device box, and such a bushing which is made of colored plastic material, must be mounted in such a manner as to visible from the front opening of the device box, thereby making it compulsory to provide openings for this purpose in the clamp used to fix it.

Because of the above mentioned structural differences and requirements, the clamps presently available in the market for fixing nonmetallic sheathed cables are usually different in structure from those used to fix armored cables. In other words, most of the manufacturers offer, on the one hand, device boxed with clamps especially devised to fix nonmetallic sheathed cables and, on the other hand, device boxes with clamps devised to fix armored cables. The consumer must then selected which one of these device boxes he or she needs. Of course, such implies a duplication in the number of parts that the retailers and professionals must keep in stock.

To solve this problem, clamps have been devised by companies like COMMANDER for use with both nonmetallic sheathed and armored cables. Such clamps are very useful but are rather complicated in structure, thereby making their packaging and handling rather complicated on an industrial scale, and their cost rather high because of the amount of metal and the number of manufacturing steps that are needed for their manufacture.

SUMMARY OF THE INVENTION

The object of the present invention is to provide a clamp which can be used with both nonmetallic sheathed and armored cables and which, as aforesaid, is very simple yet efficient in structure and very easy and cheap to manufacture.

More particularly, the object of the invention is to provide a clamp for use to fix within an electrical device box at least one cable projecting from an opening made in this box, this clamp comprising:

an L-shaped body comprising a forwardly projecting front wall and an upwardly projecting rear wall that is generally flat, the front wall being provided with a central hole and a rectilinear front edge of a given length that is parallel to the rear wall;

two upwardly embossed portions made in the front wall, the embossed portions being symmetrical with respect to the central hole and each having a semi-cylindrical cross-section with an axis perpendicular to the rear wall, each of the embossed portions ending at a short distance from the rear wall and defining therewith a locking ridge;

two front openings made in the front wall at the junction of the embossed portions with the front edge of the body; and a U-shaped element integral to and projecting from the front edge of the L-shaped body along the full length of the front edge, the U-shaped element extending downwardly at a short distance below the front wall.

In use, screwing of the clamp within the device box with a screw inserted into the central hole of the front wall of the clamp allows one or two cables to be squeezed and thus fixed either between the U-shaped element, the corresponding locking ridge and the adjacent wall of the box when the cable(s) is (are) of the nonmetallic sheathed type, or within one of the embossed portions when the cable(s) is (are) of the armored type.

Advantageously, the clamp according to the invention may further comprise a spring-loaded tab centrally made in and forwardly and downwardly projecting form the rear wall. This tab has a lower edge that extends close to the central hole of the front wall at a short distance from the front wall and is sized and shaped so as to retain the screw used to fix the clamp into the device box without preventing this screw from being rotated. For this purpose, the screw must be provided with a fixed washer which becomes engaged under the lower edge of the tab when it is fully inserted into the central hole.

As aforesaid, the clamp according to the invention is intended to be used in combination with an electrical device box provided with openings that are preferably of the knockout type and located in its upper and lower end walls, so as to fix electric cables passing through these openings.

To make such combination more efficient with armored cables, the rear wall of the device box may comprise short rectilinear, embossed ribs made in the adjacent end walls, close to each opening, each rib extending at a short angle relative to the corresponding end wall so as to better engage the external corrugations of the armored cables. The rear end wall of the device box may also comprise dot-shaped embossments made at such a distance from the adjacent end wall as to face the U-shaped element of the corresponding clamp. Each embossment extends externally and laterally with respect to the corresponding opening so as to laterally retain nonmetallic sheathed cables when such cables are used.

As can be noticed, the clamp according to the invention is very simple yet efficient in structure. It does not comprise any outwardly projecting hook-like member that would otherwise prevent it from being easily handled. It is also very easy and cheap to manufacture.

As a matter of fact, this clamp can be manufactured in a few metal stamping steps, using much less metal than is presently being used for manufacturing similar clamps (20.5 lbs of metal instead of 25 lbs for manufacturing 1000 units). Moreover, thanks to the spring-loaded tab of the clamp, the screw used for the fixation of this clamp remains locked within the same, thereby making its handling and installation much easier.

The invention and its advantages will be better understood upon reading the following non-restrictive description of a preferred embodiment thereof, reference being made to the accompanying drawings.

BRIEF DESCRIPTION OF THE DRAWINGS

FIG. 6 is a side elevational view of a clamp as shown in FIG. 2, fixing a nonmetallic sheathed cable; and FIG. 7 is a view similar to the one of FIG. 6, showing the same clamp fixing an armored cable.

DESCRIPTION OF A PREFERRED EMBODIMENT

The clamp 1 according to the invention as shown in the accompanying drawings, is intended to be used to fix electric cables into an electrical device box 3.

Figure 1:
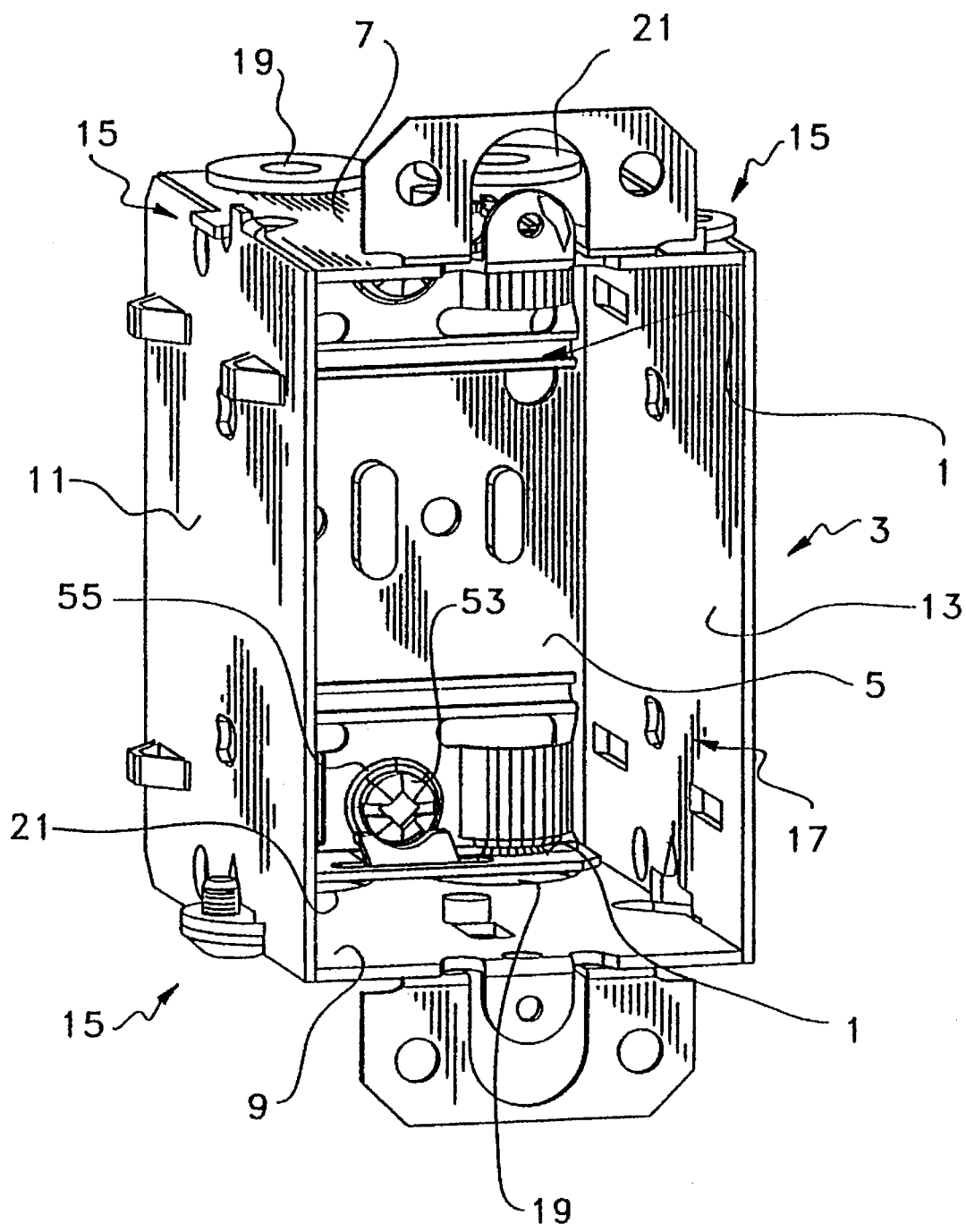
FIG. 1 is a front perspective view of an electrical device box incorporating two clamps according to the invention.

As is clearly shown in FIG. 1, the device box 3 basically comprises a generally rectangular rear wall 5 having upper and lower edges from which upper and lower end walls 7, 9 integrally project forwards from the upper and lower edges of the rear wall. These end walls 7, 9 are generally rectangular and of the same width as the rear wall 5.

The device box 3 also comprises a pair of generally rectangular side walls 11, 13 each having front, rear, top and bottom edges, and means 15 for detachably connecting the top and bottom edges of each of the side walls to the upper and lower end walls so as to form therewith and with the rear wall an open chamber 17.

A pair of openings 19, 21 preferably of the knock out type are made in at least one and preferably both of the end walls 17, 19 close to the rear wall 5, so as to allow insertion of cables into the open chamber 17. This basic structure is well known per se and needs not be further described.

Figure 4:
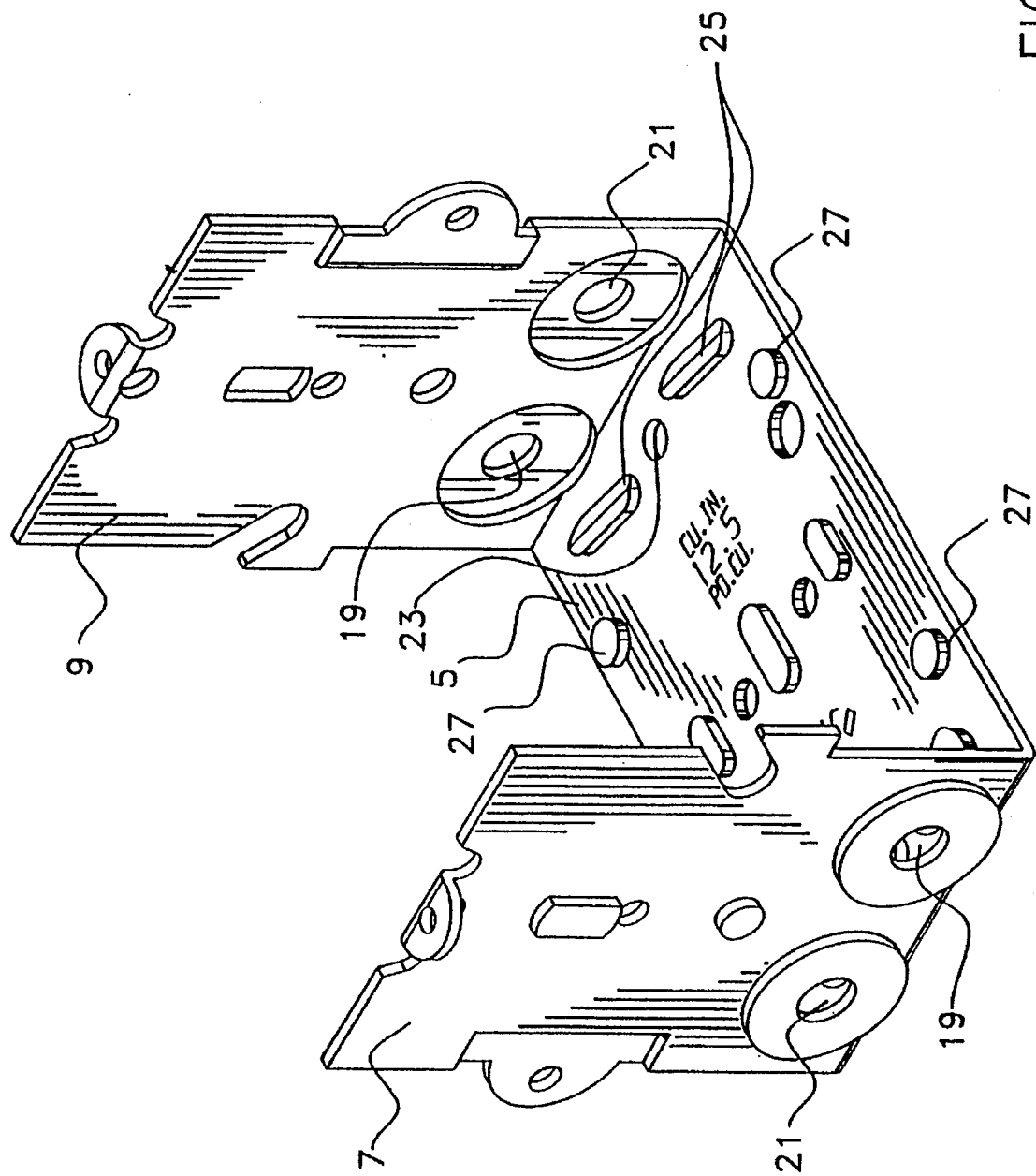
FIG. 4 is a front perspective view of the rear and upper and lower end walls of the device box shown in FIG. 1, this box being especially adapted for use with the clamp shown in FIG. 2.

As aforesaid, the clamp 1 is used to fix within the open chamber 17 one or two cables passing through one of the set of holes 19, 21. When there are two such sets, as is shown in FIGS. 1 and 4, use must then be made of two clamps 1, as is actually shown.

Figure 2:
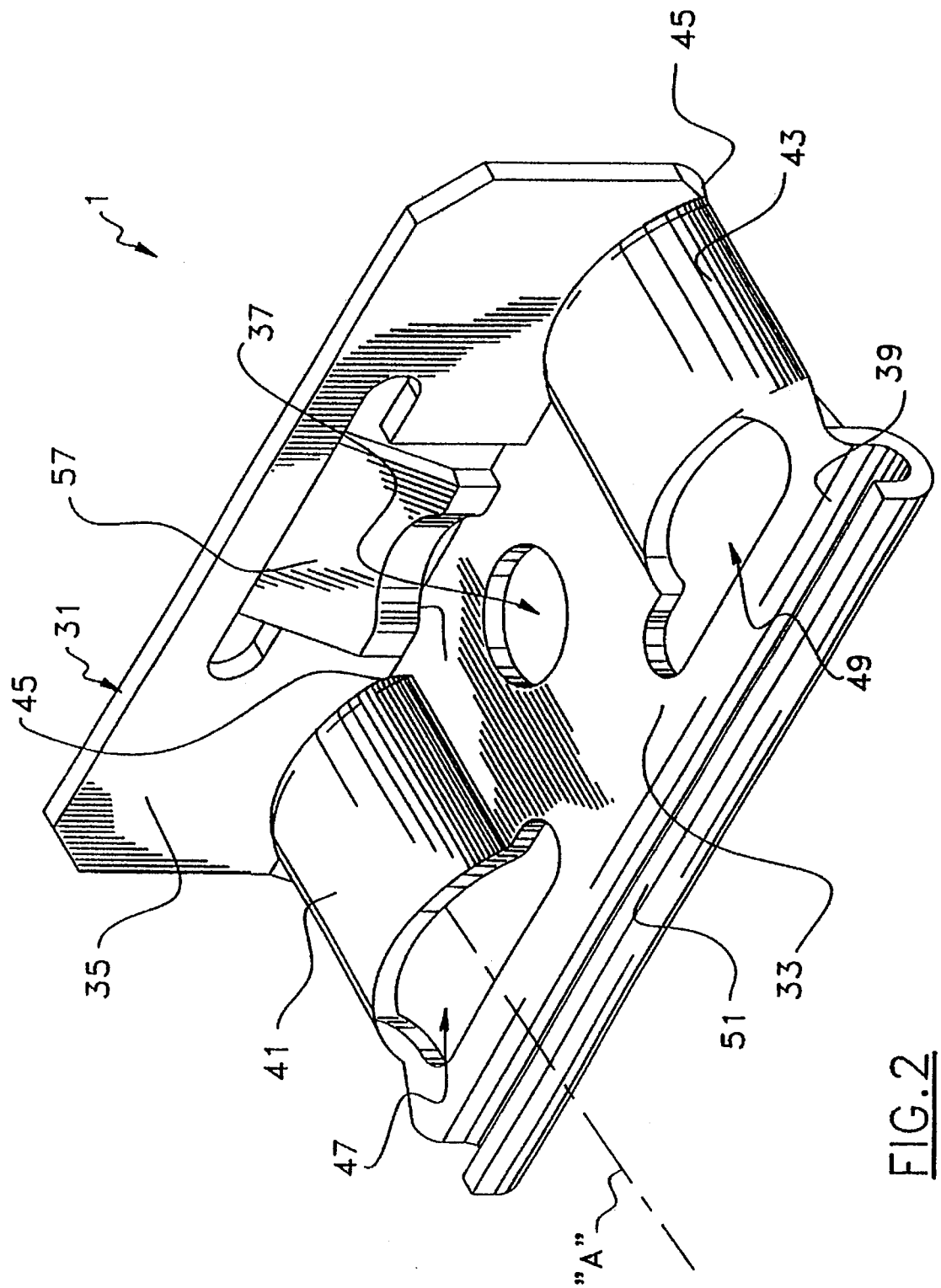
FIG. 2 is a front perspective view of a clamp according to the invention.
Figure 3:
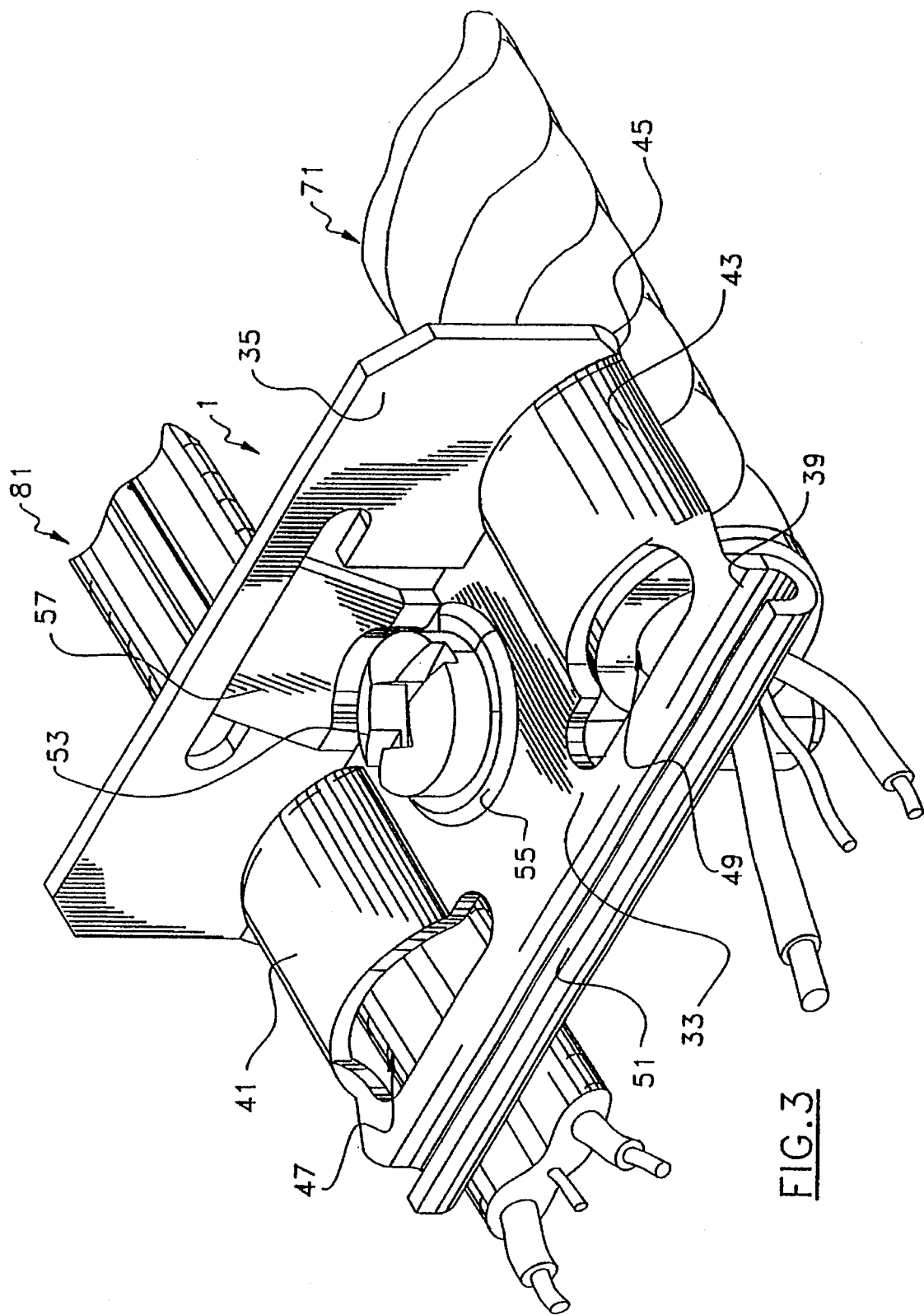
FIG. 3 is a view similar to the one of FIG. 2, showing the clamp with its fixation screw and with both a nonmetallic sheathed cable and an armored cable.

Referring now to FIGS. 2 and 3, each clamp 1 comprises an L-shaped body 31 having a forwardly projecting front wall 33 and an upwardly projecting rear wall 35 that is generally flat. The front wall 33 is provided with a central hole 37 and a rectilinear front edge 39 of a given length that is parallel to the rear wall 35.

Two upwardly embossed portions 41, 43 are made in the front wall 33. These embossed portions are symmetrical with respect to the central hole 37 and spaced apart at such a distance as to respectively face the openings 19, 21 of one of the set of openings made in the box 1. Each embossed portion 41, 43 has a semi-cylindrical cross-section with an axis "A" that is perpendicular to the rear wall. Each embossed portion is also molded or stamped in such a manner as to end at a short distance from the rear wall and thus to define therewith a kind of locking ridge 45.

Two front openings 47, 49 are made in the front wall 33 of the clamp at the junction of the embossed portions 41, 43 with the front edge 39 of the body. As is better shown in FIG. 3, the purpose of these openings is to give a visual access to the antishort bushing 75 that is used to "close" the free end of the armored cable 71, when such a cable is fixed within the open chamber of the device box 3. As already indicated in the preamble of the present disclosure, such a visual access is required by the U.S. and Canadian electric standards.

The clamp 1 further comprises a U-shaped element 51 integral to and projecting from the front edge 39 of the L-shaped body 31 along the full length of this front edge. This U-shaped element 51 extends downwardly at a short distance below the front wall 33.

Figure 5:
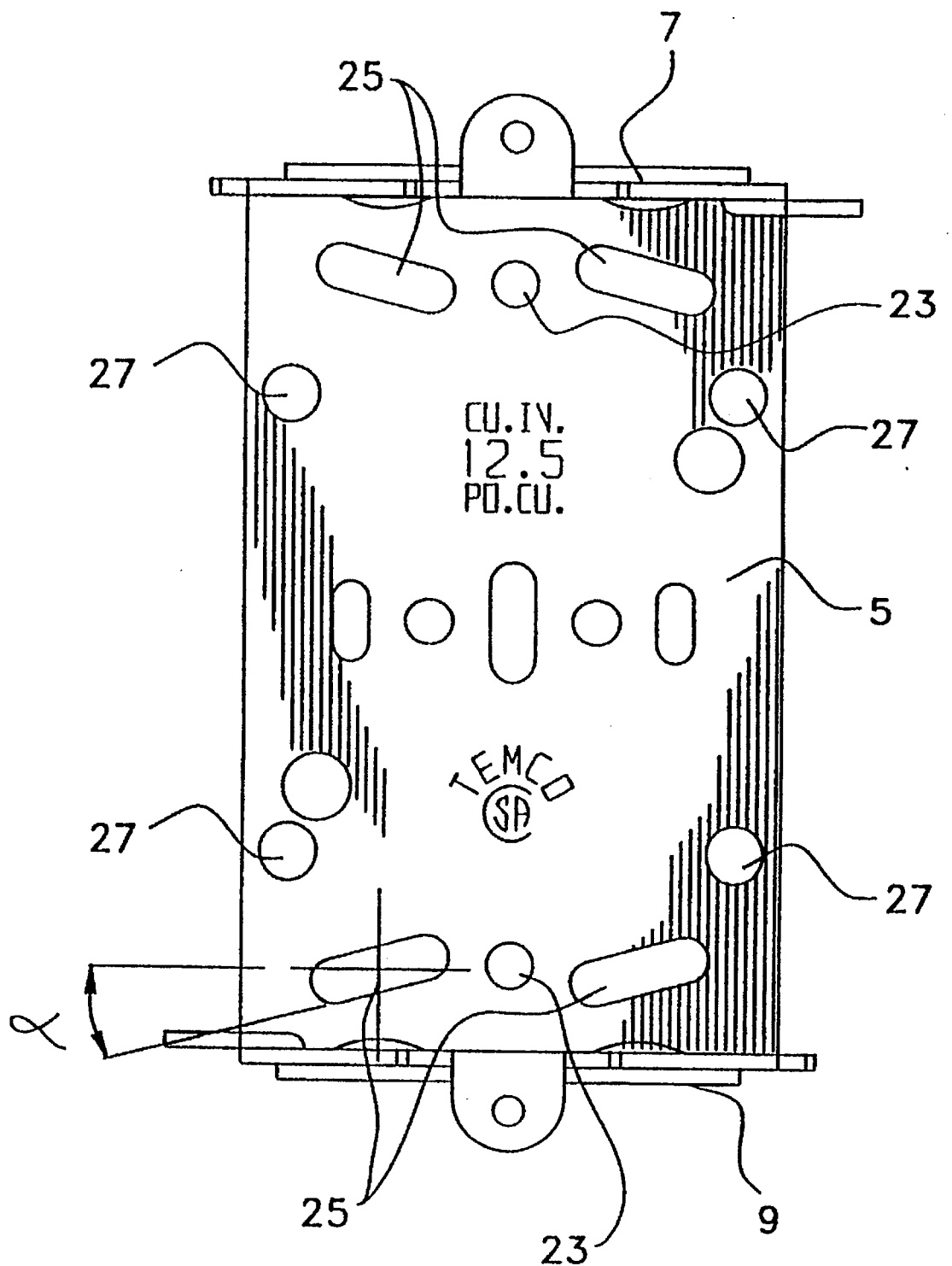
FIG. 5 is a front elevational view of the rear wall and of the upper and lower end walls shown in FIG. 4.

As is better shown in FIG. 1, each clamp 1 is fixed onto the rear wall 5 of the device box 3 by means of a screw 53 that passes throughout the central hole 37 and is thread into a hole 23 especially provided for this purpose in the rear wall 5 of the box 3 (see FIGS. 4 and 5). As can be noticed and understood, the hole 23 is positioned in such a manner that the embossed portions 41 and 43 of the clamp 1 are in operative position with respect to the corresponding holes 19 and 21 in order to fix cables passing therethrough within the device box 3 when the clamp is fixed to the same.

Advantageously, the screw 53 used to fix each clamp 1 onto the rear wall 5 of the box 1 is provided with a fixed washer 55 and the clamp 1 comprises a spring-loaded tab 57 centrally made in and forwardly and downwardly projecting its rear wall 35. The tab 57 has a lower edge 59 that extends close to the central hole 37 of the front wall 33 at a short distance from it and is sized and shaped so as to pass over and engage the washer 55 of the screw 53 when the same is fully inserted into the central hole 37, such an engagement retaining the screw without preventing the same from being rotated. This particular feature is very interesting since it makes the clamp 1 much easier to handle and install.

As it has already been explained in great detail hereinabove in the "Summary of the invention", the clamp 1 is so devised that it can be used to fix both armored cables 71 (see FIGS. 3 and 7) and nonmetallic sheathed cables 81 (see FIGS. 3 and 6).

In use, fixation of the clamp 1 within the device box 3 with the screw 53 allows one or two cables 71, 81 to be squeezed and thus fixed with the box. When the cable is of the nonmetallic sheathed type (see cable 81 in FIG. 6), it is squeezed between the U-shaped element 51, the corresponding locking ridge 45 and the adjacent rear wall 5 of the box.

When the cable is of the armored type (see cable 71 in FIG. 7), it is squeezed within one of the embossed portions, for example 43.

To "improve" the fixation of the cables 71, 81 into the device box 3, the rear wall 5 of this box can be manufactured in such a manner as to include a short rectilinear, embossed rib 25 made in the adjacent end wall, close to each opening (see FIGS. 4 and 5). As is shown, the rib 25 extends at a short angle α of, for example 15°, relative to the adjacent end wall. Thanks to its shape and orientation, the rib 25 may fully engage one of the external corrugations of the armored cable 1, which thus becomes locked.

The rear wall 5 of the box 3 can also be provided with dot-shaped embossments 27 made at such a distance from the adjacent tend wall as to face the U-shaped element 51 of the clamp 1. Each embossment extends externally and laterally with respect to the corresponding opening so as to laterally retain the nonmetallic sheathed cables 71 when such cables 71 are used.

As can be noticed, the clamp 1 according to the invention is very simple yet efficient in structure. It does not comprise any outwardly projecting hook-like member that would otherwise prevent it from being easily handled. It is also very easy and cheap to manufacture.

As a matter of fact, this clamp 1 can be manufactured with a few simple metal stamping steps, using much less metal than is presently being used for manufacturing similar clamps. Moreover, thanks to the spring-loaded tab 57, the screw used for the fixation of the clamp remains locked within the same, thereby making its handling and installation much easier.

Of course, numerous minor modifications could be made to the above described embodiment without departing from the scope of the present invention as defined in the appended claims. Thus, for example, the element 51 could be of a slightly different shape, eventhough the above described U-shaped is advantageous because it prevents the nonmetallic sheathing of the cables 81 from being inadvertently cut and torn. Similarly, the embossed portions 41 and 43 could be of a slightly different shape, provided that they may receive both kinds of cables 71 and 81.

We claim:

1. A clamp for use to fix within an electrical device box at least one cable projecting from an opening made in said box, said clamp comprising:

an L-shaped body comprising a forwardly projecting front wall and an upwardly projecting rear wall that is generally flat, said front wall being provided with a central hole and a rectilinear front edge of a given length that is parallel to the rear wall;

two upwardly embossed portions made in said front wall, said embossed portions being symmetrical with respect to the central hole and each having a semi-cylindrical cross-section with an axis perpendicular to the rear wall, each of said embossed portions ending at a short distance from the rear wall and defining therewith a locking ridge;

two front openings made in the front wall at the junction of the embossed portions with the front edge of the body; and a U-shaped element integral to and projecting from the front edge of the L-shaped body along the full length of said front edge, said U-shaped element extending downwardly at a short distance below the front wall, whereby, in use, screwing of the clamp within the device box with a screw inserted into the central hole of the front wall of said clamp allows said at least one cable to be squeezed and thus fixed either between the U-shaped element, the corresponding locking ridge and the adjacent wall of the box when the cable is of the nonmetallic sheathed type, or within one of said embossed portions when said cable is of the armored type.

2. The clamp of claim 1, further comprising:

a spring loaded tab centrally made in and forwardly and downwardly projecting from said rear wall, said tab having a lower edge that extends close to the central hole of the front wall at a short distance from said front wall and is sized and shaped so as to retain the screw used to fix the clamp into the device box without preventing said screw from being rotated, said screw being provided for this purpose with a fixed washer which becomes engaged under the lower edge of the tab when the screw is fully inserted into the central hole.

3. The clamp of claim 2, said clamp consisting of a single piece of stamped metal.

4. In an electrical device box of the type comprising:

a generally rectangular rear wall having upper and lower edges;

upper and lower end walls integrally projecting forwards from the upper and lower edges of the rear wall, respectively, said end walls being generally rectangular and of the same width as the rear wall;

a pair of generally rectangular side walls each having front, rear, top and bottom edges;

means for detachably connecting the top and bottom edges of each of the side walls to the upper and lower ends walls so as to form therewith and with the rear wall an open chamber;

a pair of openings made in any one of said upper and lower end walls close to said rear wall to allow insertion of at least one cable into said open chamber; and a clamp screwed onto the rear wall of the box to fix said at least one cable within the open chamber, the improvement wherein said clamp comprises:

an L-shaped body comprising a forwardly projecting front wall and an upwardly projecting rear wall that is generally flat, said front wall being provided with a central hole and a rectilinear front edge of a given length that is parallel to the rear wall;

two upwardly embossed portions made in said front wall, said embossed portions being symmetrical with respect to the central hole and spaced apart at such a distance as to respectively face the openings made in said box, each of said embossed portions having a semi-cylindrical cross-section with an axis that is perpendicular to the rear wall, each of said embossed portions ending at a short distance from the rear wall and defining therewith a locking ridge;

two front openings made in the front wall of the clamp at the junction of said embossed portions with the front edge of the body; and a U-shaped element integral to and projecting from the front edge of the L-shaped body along the full length of said front edge, said U-shaped element extending downwardly at a short distance below the front wall, whereby, in use, screwing of the clamp within the device box with a screw inserted into the central hole of the front wall of said clamp allows at least one cable to be squeezed and thus fixed either between the U-shaped element, the corresponding locking ridge and the adjacent wall of the box when the cable is of the nonmetallic sheathed type, or within one of said embossed portions when said cable is of the armored type.

5. The improved device box of claim 4, comprising:

another pair of openings made in the other one of said upper and lower end walls, close to the rear wall; and another similar clamp screwed onto the rear wall close to said other pair of openings to fix within the open chamber at least one cable passing therethrough.

6. The improved device box of claim 5, wherein the screws used to fix the clamps onto the rear wall of the box are each provided with a fixed washer and wherein each of said clamps comprises a spring loaded tab centrally made in and forwardly and downwardly projecting from the rear wall of the clamp, said tab having a lower edge that extends close to the central hole of the front wall at a short distance from said front wall and is sized and shaped so as to pass over and engage the washer of the screw when the same is fully inserted into the central hole, such an engagement is retaining the screw without preventing said screw from being rotated.

7. The improved device box of claim 6, wherein each of said openings made in the upper and lower end walls are of the knockout type.

8. The improved device box of claim 6, wherein the rear wall of said box comprises:

a short rectilinear, embossed rib made in the adjacent end wall, close to each opening, said rib extending at a short angle relative to said adjacent end wall; and a dot-shaped embossment made in the rear wall at such a distance from the adjacent end wall as to face the U-shaped element of the corresponding clamp, said embossment extending externally and laterally with respect to the corresponding opening so as to laterally retain the cable to be clamped whenever necessary.

9. The improved device box of claim 5, wherein the rear wall of said box comprises:

a short rectilinear, embossed rib made in the adjacent end wall, close to each opening, said rib extending at a short angle relative to said adjacent end wall; and a dot-shaped embossment made in the rear wall at such a distance from the adjacent end wall as to face the U-shaped element of the corresponding clamp, said embossment extending externally and laterally with respect to the corresponding opening so as to laterally retain the cable to be clamped whenever necessary.

* * * * *